（12） United States Patent
Hunger (10) Patent No.: US 6,220,617 B1
(45) Date of Patent: Apr. 24, 2001

(54) COUPLING DEVICE FOR CONNECTING A TOWING VEHICLE TO A SEMI-TRAILER, AND METHOD FOR THE MODIFICATION OF COUPLING DEVICES (76) Inventor: Walter Hunger, Otto-Nagler-Strasse 13, D-97074 Wuerzburg (DE)

( * ) Notice: Subject to any disclaimer, the term of this patent is extended or adjusted under 35 U.S.C. 154(b) by 0 days.

(21) Appl. No.: 09/214,149
(22) PCT Filed: Jun. 19, 1997
(86) PCT No.: PCT/EP97/03205
§ 371 Date: Jun. 2, 1999
§ 102(e) Date: Jun. 2, 1999
(87) PCT Pub. No.: WO97/49600
PCT Pub. Date: Dec. 31, 1997

(30) Foreign Application Priority Data

Jun. 21, 1996 (DE) .............................. 196 24 803
Oct. 24, 1996 (DE) .............................. 196 44 265
Nov. 15, 1996 (DE) .............................. 196 47 211

(51) Int. Cl.[7] .................................................... B62D 53/06
(52) U.S. Cl. ......................... 280/433; 280/504; 280/515
(58) Field of Search ................................. 280/515, 433, 280/504; 384/591, 592, 593

(56) References Cited

U.S. PATENT DOCUMENTS

| 3,870,342 | * | 3/1975 | Baxter et al. .................... 280/433 |
| 3,894,676 | * | 7/1975 | Oppenheim et al. ............... 228/182 |
| 4,236,863 | * | 12/1980 | Baron ............................ 414/687 |
| 4,382,100 |   | 5/1983 | Holland ........................... 427/38 |
| 4,428,595 | * | 1/1984 | Martin et al. .................... 280/433 |
| 4,478,425 | * | 10/1984 | Benko ............................ 280/433 |
| 4,592,566 | * | 6/1986 | Inoue et al. ..................... 280/433 |
| 4,828,328 | * | 5/1989 | Bowman ........................... 301/130 |
| 4,986,923 |   | 1/1991 | Waynick .......................... 252/25 |
| 5,223,161 |   | 6/1993 | Waynick .......................... 252/25 |
| 5,411,281 | * | 5/1995 | Poirer ............................ 280/433 |
| 5,746,438 | * | 5/1998 | Bergmann et al. .................. 280/443 |

FOREIGN PATENT DOCUMENTS 196 37 511 A1 * 3/1998 (DE) ..................................... 384/591

OTHER PUBLICATIONS

M. Grischke, "Amorpher Kohlenstoff—Mehr Als Eine Hartstoffshcicht", Dünne Schichten, Sounderdruck Aus Jot Jan. 1994.
"Für alle Metalle" No. 554 Excerpt from *Der Konstruckteur*.
"Dampf schafft Widerstand,—CVD—Verfahen contra Adhäsiverschleiss" Excerpt from *Produktion*, Apr. 15, 1993, Nr. 15.

* cited by examiner

*Primary Examiner*—Brian L. Johnson
*Assistant Examiner*—Daniel Yeagley
(74) *Attorney, Agent, or Firm*—Oppenheimer Wolff & Donnelly, LLP; Claude A. S. Hamrick (57) ABSTRACT An improved coupling device for connecting a towing vehicle to a semi-trailer and including a kingpin for attachment to a trailer and a tractor coupling plate for attachment to a towing vehicle, the tractor coupling plate having locking elements for positive and rotatable grasping of substantially rotationally symmetrical surfaces of the kingpin. The kingpin surfaces are formed by the outer surfaces of a thermally coated sleeve disposed about a kingpin stud and rotatable thereon. A method for corresponding modification of used coupling devices is also disclosed.

41 Claims, 6 Drawing Sheets

COUPLING DEVICE FOR CONNECTING A TOWING VEHICLE TO A SEMI-TRAILER, AND METHOD FOR THE MODIFICATION OF COUPLING DEVICES

BACKGROUND OF THE INVENTION

The invention relates to a coupling device for connecting a towing vehicle to a semi-trailer, in which a kingpin is arranged on the trailer and a tractor coupling on the towing vehicle, said tractor coupling having locking elements for positive and rotatable grasping of substantially rotationally symmetrical surfaces of the kingpin, the surfaces being formed by an abrasion-resistant thermal coating.

A coupling device of the aforesaid kind is known from DE A1-43 04 857.

The invention further concerns a method for modifying coupling devices for connecting a towing vehicle to a semi-trailer, in which a kingpin is arranged on the trailer and a tractor coupling on the towing vehicle, said tractor coupling having locking elements for positive and rotatable grasping of substantially rotationally symmetrical surfaces of the kingpin, in a state in which lubricant-free and thus maintenance-free operation of the coupling device is possible.

Tractor couplings serve to connect trailer towing vehicles or tractor trucks in a positive but articulated manner to semi-trailers, together forming a so-called tractor-trailer unit.

Arranged on the towing vehicle is a coupling plate which is of substantially horseshoe-shaped configuration in plan view, so that a throat faces in the backward direction of the towing vehicle. A part, also horseshoe-shaped, called the wear ring is attached at the base of the throat. Located on either side of the wear ring are locking parts, in particular a so-called lokking hook, which initially (i.e. when the tractor coupling is open) are out of engagement with the throat opening.

Located on the trailer, on the underside of the front end, is a downward-pointing so-called kingpin, which in order to connect the towing vehicle and trailer is slid into the throat opening until it comes into contact with the wear ring. The locking parts are then brought into their closed position, and positively surround the kingpin. The surfaces of the wear ring, the locking hook, and the kingpin which thereby come into contact with one another respectively allow rotation of the coupling pin in the coupling plate. They are thus, to that extent, configured with rotationally symmetrical surfaces.

In the closed state, the wear ring and locking hook accordingly form a circular ring. The kingpin, received in the arrangement made up of locking hook and wear ring, has little or only minimal clearance in order to create a smooth connection between the trailer and truck.

The surfaces of the wear ring and locking hook which together wrap around the kingpin form contact surfaces for the kingpin.

During operation of the vehicle, in particular in curves, when the kingpin rotates in the arrangement made up of the wear ring and locking hook, correspondingly severe friction occurs between these parts, leading to frictional losses and wear on the kingpin, wear ring, and locking hook. After a corresponding period of operation, the diameter of the kingpin decreases as a result of wear.

Standards stipulate that a maximum reduction in kingpin diameter of approximately 2 mm is permissible, and the kingpin must then be replaced.

Tractor couplings of the kind set forth above are commonly known, and are widely used on a standard basis in tractor-trailer units.

An essential problem in tractor couplings of conventional type is friction between the mutually contacting surfaces of the towing vehicle on the one hand and the trailer on the other hand, especially in the contact region on the coupling plate and in the region of the kingpin. In conventional tractor couplings, therefore, a so-called plate lubrication system is used, in which wide lubricating grooves are provided for optimum greasing of the contact surfaces in the coupling plate. Because of the relatively large dimensions of coupling plates, the quantities of lubricating grease are correspondingly large.

It is known that conventional lubricated tractor couplings of this kind represent a considerable environmental problem, since large quantities of lubricating grease pass from these tractor couplings into the environment, and thus represent a hazard to, for example, groundwater.

Numerous tractor couplings are therefore already known in which so-called anti-friction coatings are used in the region of the coupling plate contact surface. Tractor couplings of this kind are referred to as "low-maintenance," since in them, only the bearing point of the kingpin in the locking member of the tractor coupling needs to be lubricated.

DE 35 30 467 A1 proposes, for a tractor coupling, to equip those surfaces of the wear ring and the locking hook that come into contact with the kingpin, with an anti-friction film. A polytetrafluoroethylene (PTFE) material was used as the anti-friction film. The anti-friction film consists more precisely of a PTFE-coated netting which is adhesively bonded onto the relevant surfaces of the wear ring and the locking hook, in a milled recess thereof.

Although PTFE possesses outstanding slip and anti-adhesion properties that are also familiar from other areas (coatings on cookware and clothes iron soleplates), one disadvantage of a PTFE anti-friction film for coupling plates is that the PTFE itself is subjected in practical use to extreme wear. In addition to perceptible creep behavior under the static load to which the PTFE film applied onto the wear ring and the locking hook is subjected (and which rapidly reduces tolerances to less than acceptable levels when PTFE is used on tractor couplings), PTFE offers practically no wear resistance with respect to abrasive materials.

But in a tractor coupling, because of the high surface pressure exerted by the kingpin on the wear ring and the locking hook, the anti-friction film must specifically be highly resistant to creep. In addition, if lubrication is to be partially or completely dispensed with (which is entirely desirable), the kingpin acts in highly abrasive fashion with respect to the PTFE, thus resulting in excessively rapid wear on the PTFE coating.

On the other hand, anti-friction films made of hard metal compounds such as titanium nitride have also been used for tractor couplings; these do protect the contact surfaces of the locking hook and wear ring from abrasion, but increase the abrasion of the kingpin to the same degree. The result is that the kingpin must also be equipped with an anti-friction film; but this considerably increases the expense.

DE-A-37 28 090 discloses a completely maintenance-free tractor coupling. In this known tractor coupling, the kingpin is held in a separable rolling bearing which is opened when the trailer is being coupled, and then closed again in the coupled position. The rolling bearing is lubricant-free, and allows the kingpin to rotate in the tractor coupling lock.

It is known from the aforecited DE-A1-43 04 857 to provide a thermal coating both in the region of the contact surface of the tractor coupling and in the region of the kingpin. This thermal coating consists of a thermally sprayed hard-material film, for example, a ceramic oxide, in particular aluminum oxide or titanium oxide, onto which a sliding agent film, in particular polytetrafluoroethylene, is applied. Coating systems of this kind are also known from other technology sectors, for example the technology of coating printing press cylinders, frying pans, and clothes iron soleplates.

Ceramic materials have the basic disadvantage that they are relatively brittle and thus sensitive to impact loads. Considerable impact loads can, however, occur in tractor couplings, especially when a trailer is being coupled to a towing vehicle.

Because of the considerable problems with regard to environmental protection, the idea has moreover arisen of making available methods with which conventionally lubricated tractor couplings can be brought into a state in which at least low-lubricant and thus low-maintenance operation is possible. In this connection, consideration has already been given to reworking tractor couplings that are already in operation by applying onto the contact surface of the plate the anti-friction coatings mentioned above, so as thereby at least to reduce the lubricant quantity required in a conventional surface lubrication system.

Modification into a completely maintenance-free state is not, however, possible therewith.

SUMMARY OF THE INVENTION

It is therefore the object of the invention to develop a coupling device and a method of the kind cited initially in such a way that completely lubricant-free and thus maintenance-free operation is possible, both in newly manufactured tractor couplings but also by modification of those already in operation.

In addition, an effort is to be made to improve the coupling device of the kind cited initially in such a way that without the use of lubricants, wear and frictional losses between the kingpin, wear ring, and locking hook are reduced, and the ease of maintenance and environmental compatibility of the tractor coupling are thereby enhanced.

In a coupling device of the kind cited initially, this object is achieved, according to the present invention, in that the surfaces are formed by outer surfaces of a thermally coated sleeve sitting on the kingpin, the sleeve, with inner surfaces, being arranged to be rotatable with inner surfaces on the kingpin.

In a method of the kind cited initially, the object is achieved, according to the present invention, by the following steps:

a) lathe-turn the surfaces of the kingpin off by a predefined overmeasure;

b) manufacture a sleeve for placement on the turned-off kingpin, the wall thickness of the sleeve being substantially identical to the overmeasure;

c) thermally coat at least the outer surface of the sleeve with an abrasion-resistant coating; and d) place the sleeve onto the turned-off kingpin in such a way that the sleeve is rotatable on the kingpin.

The object of the invention is completely achieved in this manner.

The fact that a float-mounted sleeve, whose surfaces are at least partially thermally coated in abrasion-resistant fashion, is arranged on the kingpin first of all results in a considerable enlargement of the load-bearing surface area. The reason is that while in conventional coupling devices the wear ring and the locking hook contact one another only along small, arc-shaped surface segments at the corresponding surfaces of the kingpin, according to the present invention it is possible for the entire inner surface of the sleeve also to form a friction pairing, so that the load per unit of surface area is substantially lower.

This is true in particular with regard to impact loads, which in the case of the sleeve according to the present invention are intercepted over substantially larger surface areas.

In addition, the use of a sleeve makes it possible to utilize almost any desired thermal or other coating method, since only a relatively small element, namely the sleeve, needs to be coated in each case. It is therefore not necessary to coat the kingpin itself, the kingpin with its associated attachment flange being a component of considerable size and weight.

As has already been mentioned, the invention is usable both in the manufacture of new coupling devices and in the reworking of coupling devices that are already in operation.

In the former case, the kingpin must be manufactured at the factory in such a way that its outer circumference is smaller, by an amount equal to the wall thickness of the sleeve, than the standardized outside dimensions of a standard kingpin.

When used coupling devices are being reworked, on the other hand, it is necessary to machine the kingpins by correspondingly turning off their surfaces. This is only possible, however, if the wear on the kingpin has not already assumed too great a magnitude. In a practical exemplifying embodiment of the invention, the slid-on sleeve has a wall thickness of, for example, 1 mm. The total wear permitted according to DIN, however, is 2 mm. If the wear is already greater than 1 mm, the used kingpin can no longer be turned off and equipped with a sleeve; given the aforementioned wall thickness of the sleeve, reworking is then no longer possible.

In both cases, the desired end can be achieved with relatively little efford.

In a development of the invention, the sleeve is equipped on its outer surface with a roughening.

The advantage of this feature is that a greater adhesion or friction is established between the sleeve and the coupling hook or wear ring than between the sleeve and the internally located body of the kingpin. The sleeve then rotates substantially on the body of the kingpin, i.e. predominantly on its inner side, which is internal and protected, and less on its exposed outer side relative to the wear ring and the coupling hook.

It is particularly preferred for this purpose if the roughening has a surface roughness which is greater than the thickness of the thermal coating.

The advantages of the mechanical stability of the thermal coating are then retained, even though a greater coefficient of friction is established on the outer side of the sleeve than on the inner side.

In a preferred embodiment of the coupling device according to the present invention, the inner surfaces of the sleeve are also formed by an abrasion-resistant thermal coating.

This feature has the advantage that the desired abrasion-resistant friction pairings can be applied simultaneously in the same coating operation.

Alternatively, however, it is also possible to equip the inner surfaces of the sleeve with a rolling bearing arrangement.

It is furthermore particularly preferred if the thermal coating is a carbon-based film, in particular a film made of substantially amorphous carbon.

Practical experiments have shown that this coating completely meets the requirements for this application. In exemplifying embodiments of the coupling device according to the invention, the sleeve is of multi-shelled configuration in the circumferential direction.

The advantage of this feature is that it makes possible easy installation and, if applicable, removal of the sleeve onto and from the kingpin. Consideration must be given in this context to the fact that DIN-standardized kingpins have an axial region of smaller diameter, i.e. a constriction. A sleeve thus cannot be axially slid on, but rather must be placed onto the kingpin substantially in a radial direction.

In a group of exemplifying embodiments, the sleeve is of two-shelled configuration.

Good efficiency is attained with multi-shelled sleeves by the fact that the sleeve is equipped, at least at one of its axial ends, with a circumferential bevel that tapers the sleeve toward its ends, the sleeve being axially secured by means of counterbevels of attachment elements.

The advantage of this feature is that the sleeve cannot escape radially or even fall off, since the sleeve is retained positively in the radial direction.

The attachment elements can be configured at the free end of the kingpin as a cover, and at the opposite end as a ring.

It is preferred in this context if the ring is axially displaceable on the kingpin and axially supported by the kingpin, in particular by means of an O-ring.

This features has the advantage that a resilient compression of the sleeve in the axial direction is possible. The sleeve therefore cannot loosen even it is exposed to a continuous alternating load.

In a further group of exemplifying embodiments, the sleeve is of multi-part configuration in the axial direction.

The advantage of this feature is that installation of the sleeve onto the body is simplified, since it merely needs to be slid on axially.

It is further preferred in the case of these exemplifying embodiments if the kingpin comprises an axially multi-part body, a lower part arranged at the free end of the kingpin being removable, and the several sleeves being slidable, when the lower part has been removed, onto an upper part of the body.

This feature has the advantage that the sleeves can be slid on axially both in the reduced-diameter region and in the upper region with a greater diameter.

In the exemplifying embodiment mentioned above, particularly good efficiency is attained by the fact that the lower part is mounted positively in the radial direction in the upper part.

This features has the advantage that the forces acting radially on the kingpin make possible additional security against overloading.

This is especially true if the lower part is mounted in the upper part via frustoconical seat.

The advantage of this feature is that the aforementioned enhanced strength is made possible with a relatively simple design and thus economical manufacture.

In the aforesaid exemplifying embodiments, it is furthermore preferred if the lower part is thread-joined to the upper part. It is particularly preferred in this context if the lower part is thread-joined to the upper part via an axial threaded stud.

This feature has the advantage of making possible easy installation of the kingpin, without thereby resulting in disadvantages in terms of its stability.

In the kingpin according to the present invention, its several constituents can be threaded together in different fashions.

In the preferred development of this variant, the threaded stud is inserted through the upper part from a side of the kingpin facing away from the lower part, and thread-joined at its free end to the lower part.

The free end of the threaded stud then preferably engages into a threaded bore of a lower part at the free end of the kingpin, and pulls the latter toward the upper part. This has the advantage that at the free end of the kingpin, no screw heads or the like project, and no physical weakening is caused by corresponding countersinks.

It is further preferred in this case if the threaded stud is of conical configuration, and is inserted into a conical passthrough bore of the upper part and pressed there.

The advantage of this feature is that the threaded stud is first immobilized by being axially pressed in, and then the lower part can be screwed onto the threaded portion of the threaded stud which projects freely from the upper part.

In further variants of this group of exemplifying embodiments, the sleeves have a different diameter and rest, on axially opposite sides, against a disk which is slid onto the body and extends substantially radially.

This feature has the advantage that the entire surface that is externally visible is constituted, both in its peripheral regions and in a radial transition surface, by externally mounted constituents. Optimum surface properties can thus be established at all the aforesaid points.

It is further preferred if the sleeves are retained axially by thread-joining of the several parts of the body.

This features has the advantage that axial mounting of the sleeve is achieved with means of simple design.

It is further preferred if the sleeve consists of hard metal. It is preferably burnished on its surfaces provided for the thermal coating. This yields a mirror-smooth surface to which the coating adheres particularly well, yielding an ideally rotationally symmetrical surface after coating. In a preferred development of the invention which nevertheless is also usable in isolation, the anti-friction film is constituted as a carbon-based film.

It has been found that carbon-based films, i.e. carbon-containing or simply carbon films, are characterized by extremely high resistance to creep, by extreme hardness, and nevertheless by extremely low friction against mating elements made, for example, of steel. The use of a carbon film as anti-friction film on the surfaces of the wear ring and the locking hook which come into contact with the kingpin creates the possibility of entirely dispensing with the use of lubricants for the kingpin. As compared with PTFE, which does have good anti-adhesion properties, a carbon film has the advantage that the latter is itself extremely hard, and that in contrast to a PTFE coating, an additional hard-material base film can be dispensed with. It has furthermore proven particularly advantageous that as a result of contact between the carbon film and the steel body of the kingpin, a portion of the carbon film transfers onto the steel body, thus effecting dry lubrication of the kingpin bearing point, which of itself reduces friction between the kingpin and the locking hook or wear ring. The converse has not been observed, i.e. transference of steel from the kingpin onto the carbon film; this means that practically no wear is occurring on the kingpin, in contrast to the use of titanium nitride coatings.

In a preferred embodiment, the carbon-based film has an amorphous structure.

Amorphous carbon films, as an advantageous example of carbon-based films, possess outstanding dry lubrication properties, so that no lubricant at all needs to be used, thus greatly improving the environmental compatibility of the tractor coupling. Because of its property of acting as a dry lubricant, the amorphous carbon film represents optimum wear protection both for the kingpin and for the wear ring and locking hook, without thereby being subject to wear itself, since the amorphous carbon film still has sufficient hardness. The amorphous carbon film is thus capable of withstanding the high surface pressure.

In a further preferred embodiment, the carbon-based film is a pure carbon film with a diamond-like structure.

At a film thickness of approximately 1 to 10 μm, diamond-like carbon films have extremely high hardness values of 3,000 HV; in addition to this high hardness, they also possess an elasticity which, in combination with their hardness, results in very high wear resistance, thus yielding an optimal surface finish for the wear ring and locking hook.

In a further preferred embodiment, an adhesion primer film is arranged between the carbon film and the surfaces.

This feature advantageously enhances the adhesion of the carbon film on the steel body of the wear ring and the locking hook, especially in the case of the thin amorphous carbon films. The adhesion films can generally consist of sputtered metals such as aluminum, titanium, or chromium.

It is further preferred if the carbon film is metal-containing. The addition of metals can advantageously improve the adhesion of amorphous carbon films instead of using an additional adhesion film; a further advantage is the fact that metal-containing carbon films can be applied at a higher coating rate using the sputtering method. Aluminum, titanium, or chromium can again be used as the metals.

It is further preferred if the carbon film is applied using a film deposition method, in particular a PECVD method.

Methods of this kind on the one hand make it possible to apply the carbon film at thicknesses of a few μm, which are particularly favorable for their hardness, and on the other hand a good bond is created between the carbon film and the steel body of the locking hook and wear ring.

The carbon film preferably has a thickness of approximately 1 to 20 μm.

As already mentioned, at this thickness carbon films possess a very high hardness value as well as sufficient elasticity, which are optimal for use thereof for a wear-free coupling.

Further advantages are evident from the description and the appended drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

An exemplifying embodiment of the invention is shown in the appended drawings and will be explained in more detail in the description below. In the drawings.

DETAILED DESCRIPTION

Figure 1:
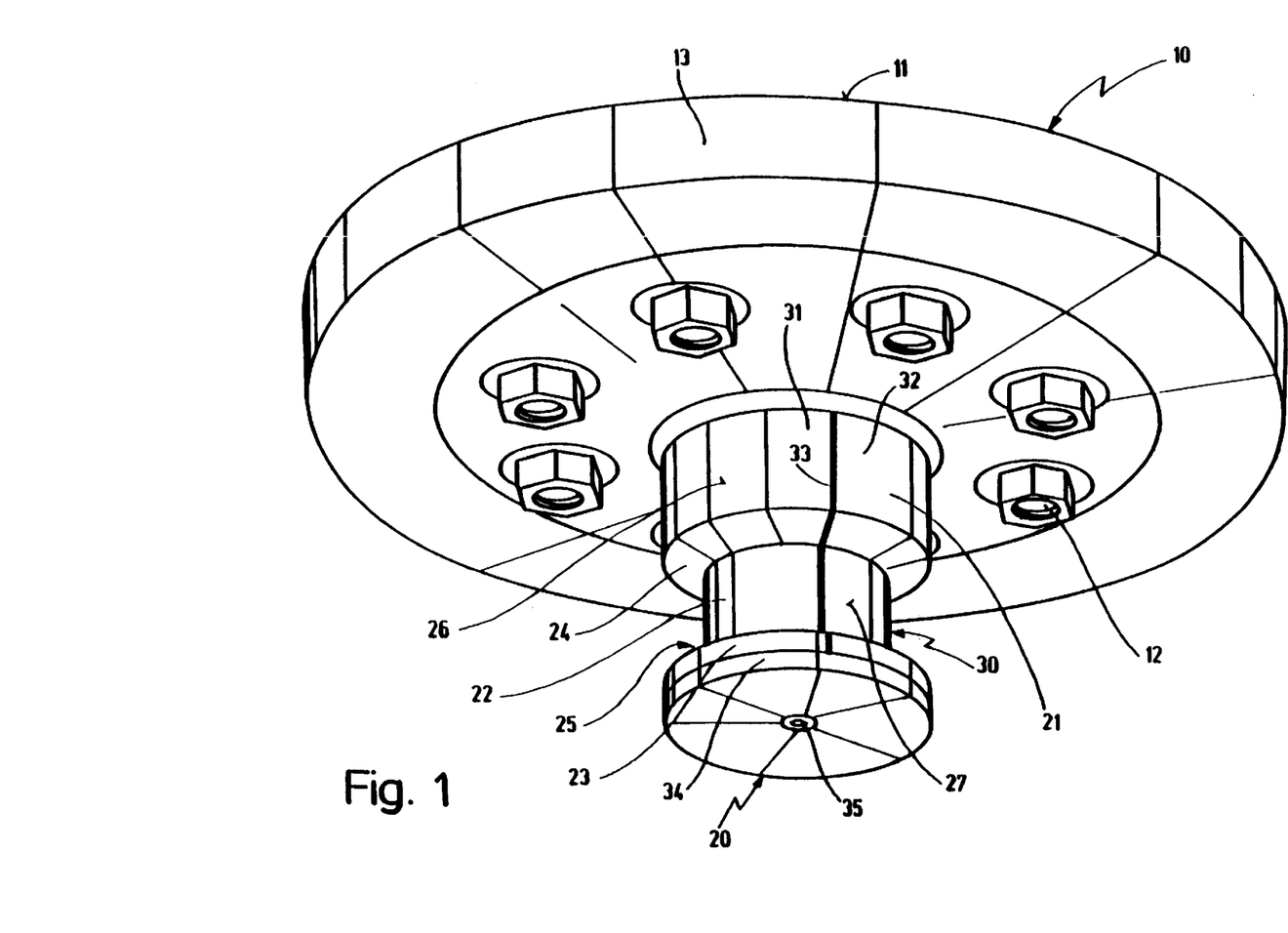
FIG. 1 shows a perspective view, from below, of a kingpin arrangement.

In FIG. 1, 10 designates the entirety of a kingpin arrangement. Arrangement 10 is attached, at its upper side 11 which is not visible in FIG. 1, on the underside of a semi-trailer, for example with bolts 12 which extend through an annular flange 13 of arrangement 10.

A kingpin 20 extends downward from the underside of flange 13. Kingpin 20 has an upper section 21, a middle section 22, and a lower section 23. Upper and lower sections 21, 23 have the same outside diameter, while middle section 22 has a smaller diameter. Sections 21, 22, 23 are joined to one another via conical transitions 24, 25 (see also FIG. 2).

The dimensions of kingpin 20 are standardized. DIN Standard 74-080 is applicable in the Federal Republic of Germany.

Kingpin 20 is equipped on its surface with a sleeve 30 which covers the entire circumferential surface of kingpin 20.

Sleeve 30 is split in two in the axial direction, and comprises a first half shell 31 and a second half shell 32, each of which covers approximately 180 degrees of the circumference of kingpin 20. They are separated from one another by a seam 33.

At the free end of kingpin 20, the double-shell sleeve 30 is retained by means of a cover 34 which is screwed by means of an axial bolt 35 onto lower section 23.

Figure 2:
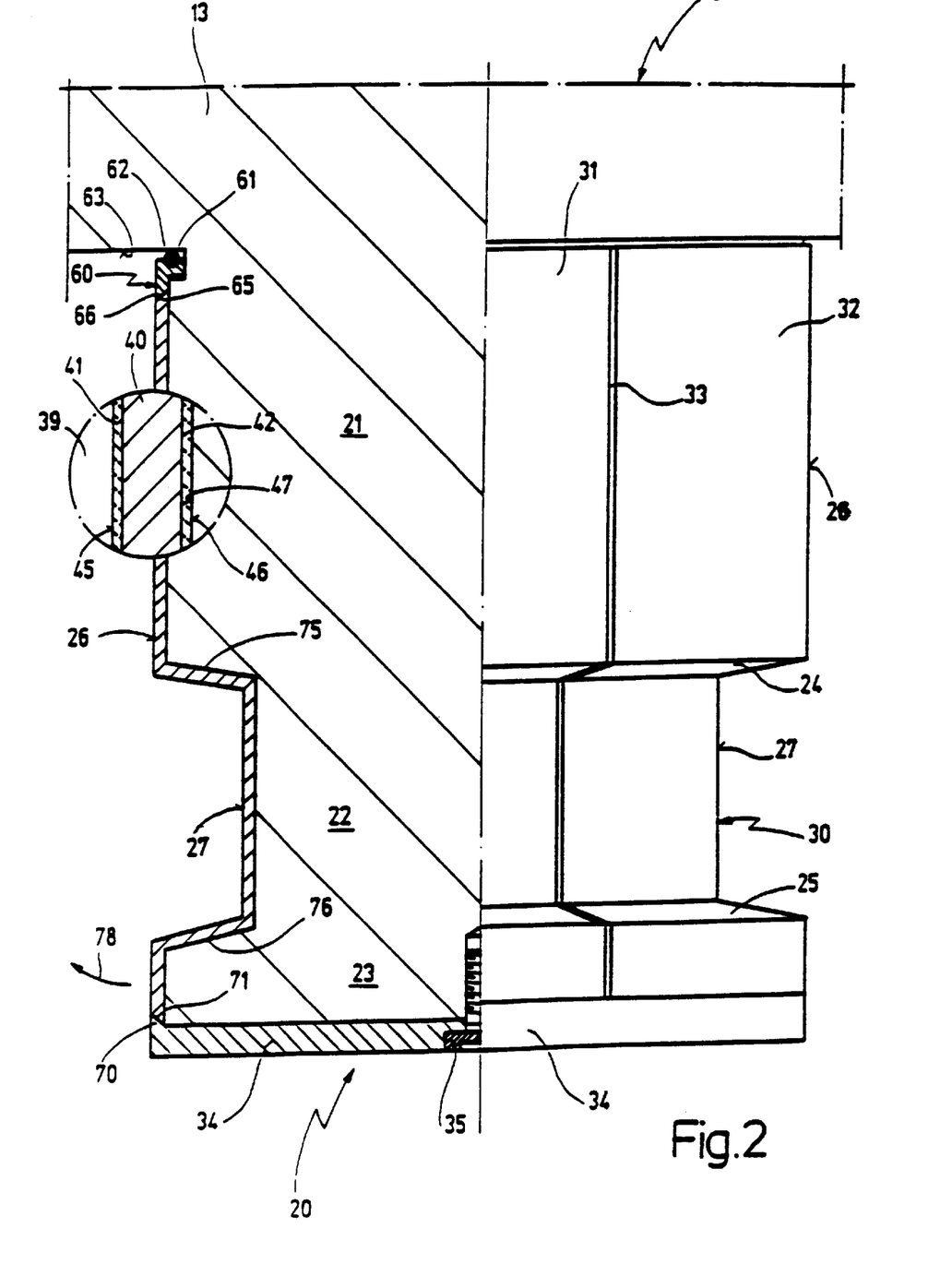
FIG. 2 shows a side view of the kingpin according to FIG. 1, at enlarged scale and semi-sectioned.

Further details of the arrangement are evident from FIG. 2.

It is evident from the half-section on the left side of FIG. 2 that left-hand half shell 31 of sleeve 30 is one-piece. As the enlarged section 39 shows, a wall 40 of sleeve 30 is equipped with an outer film 41 and an inner film 42. Films 41 and 42 thus form an outer surface 45 and inner surface 46, respectively, of sleeve 30.

Outer surface 45 is thus the outer surface of kingpin 20, while inner surface 46 rests on a countersurface 47 of the kingpin body.

Sleeve 30 thus represents a floating mount, since on the one hand it is self-rotatable on kingpin 20 along the friction pairing of surfaces 46/47, and on the other hand with its outer surface 45 it represents an engagement surface for the locking elements of the tractor coupling.

Sleeve 30 is axially elastically compressed onto kingpin 20.

For this purpose, a ring 60 is provided in the transition from kingpin 20 to flange 13. Ring 60 is slightly displaceable in the axial direction on kingpin 20, as indicated by a bearing 61. Located between ring 60 and a radial surface 63 of flange 13 is an O-ring 62 which acts elastically in the axial direction.

Sleeve 30 is equipped, at its upper end in FIG. 2, with a bevel 65 at which sleeve 30 tapers toward its free end. The taper angle of bevel 65 can be, for example, 45 degrees.

Ring 60, on the other hand, is equipped with a complementary counterbevel 66 against which bevel 65 rests positively.

Correspondingly, there is provided at the lower free end of sleeve 30 a bevel 71 which rests positively against a collar 70 of complementary shape on the outer circumference of cover 34.

When cover 34 is then screwed on by means of axial bolts 35, sleeve 30 is axially compressed with its bevels 65, 71 and retained positively.

The arrangement is such that sleeve 30 can be easily installed and removed. For this purpose, bevels 75, 76 in the region of transitions 24, 25 are embodied, for example, with the maximum permissible taper angle of 6 degrees. Then, for example after removal of cover 34, left-hand half shell 31 can be tilted away outward as indicated by an arrow 78 in FIG. 2.

If the arrangement shown in FIG. 2 is used for a newly manufactured coupling device, kingpin 20 must be dimensioned in terms of its diameters, as compared with the standardized values, in such a way that the external configuration conforms to standard dimensions after sleeve 30 has been put in place.

If, on the other hand, it is planned to modify a coupling device that has already been used, the kingpin must be turned off on its circumference to an extent corresponding to the wall thickness of sleeve 30.

Films 41, 42 on both sides of wall 40 of sleeve 30 are preferably applied by thermal coating. It is particularly preferred to apply a carbon-based film, in particular a film which consists substantially of amorphous carbon. Films of this kind are applied in a so-called film deposition method, in particular a PECVD method. The thickness of films 41, 42 is, for example, between 1 and 20 μm. Diamond-like carbon films of extremely high hardness values of 3,000 HV are created; in addition to this great hardness, these films still possess elasticity. This results, in combination with their hardness, in a very high wear resistance both during coupling and during normal road use.

It is understood that in order to improve the adhesion of films 41, 42, corresponding adhesion films can also be provided, consisting generally of sputtered metal films made, for example, of aluminum, titanium, or chromium, or alloys thereof.

In order to achieve particularly good friction pairings and in order to improve the adhesion of films 41, 42 on wall 40 of sleeve 30, the surface of sleeve 30 is preferably burnished before application of the films. For burnishing, sleeve 30 is clamped in a turning apparatus and acted upon by a polished diamond sphere which is moved, with very slow axial feed, along the sleeve's surface as it rotates. This results in a displacement of material at the surface of sleeve 30, the ultimate result being an almost mirror-smooth surface.

Figure 3:
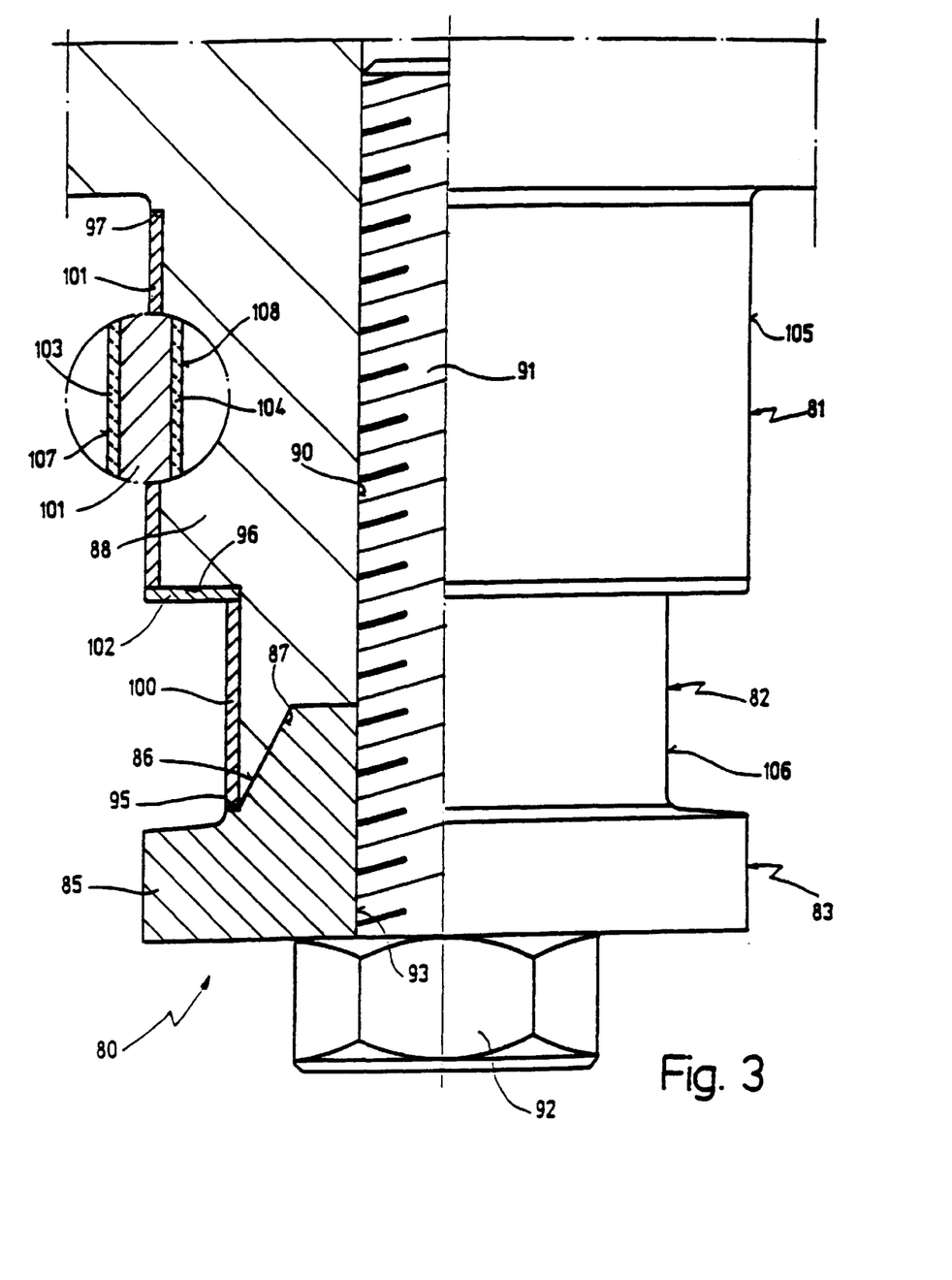
FIG. 3 shows a view similar to FIG. 2, but for a modified exemplifying embodiment.

FIG. 3 shows a variant of the exemplifying embodiment according to FIG. 2.

A kingpin 80 once again has an upper section 81, a middle section 82, and a lower section 83. The external configuration of kingpin 80 thus corresponds substantially to that of kingpin 20 according to FIGS. 1 and 2.

In contrast to the aforesaid exemplifying embodiment, however, the body of kingpin 80 has a separate lower part 85 that is joined via a frustoconical mating surface 86/87 to an upper part 88 of kingpin 80.

A threaded bore 90 is provided in upper part 88 in order to join lower part 85 to upper part 88. A threaded stud 91 having a head 92 is inserted through a passthrough bore 93 in head 92 aligning with threaded bore 90, and threaded into threaded bore 90. Lower part 85 is thereby axially thread-joined onto upper part 88. The positive join in the region of mating surface 86/87 yields greater strength in terms of radial stresses at the free end of kingpin 80.

A first radial circumferential shoulder 95 is provided at the foot of mating surface 86 of lower part 85. A second radial circumferential shoulder 96 is located at the upper (in FIG. 3) end of middle section 82 on upper part 88. Lastly, a third radial circumferential shoulder 97 is provided at the upper (in FIG. 3) end of upper section 81, once again on upper part 88. Kingpin 80 is equipped with a first sleeve 100 and a second sleeve 101, and with a ring 102 located between them and lying substantially in a radial plane.

First sleeve 100 is supported at the bottom by first radial circumferential shoulder 95, and at the top by ring 102. Ring 102 in turn rests against second radial circumferential shoulder 96.

Second sleeve 101 rests at the bottom on the upper side of ring 102 (which projects to that extent beyond upper part 88), and moreover rests at the top against third radial circumferential shoulder 97.

The arrangement in FIG. 3 is such that the thread-joining of lower part 85 and upper part 88 does not cause sleeves 100, 101 and ring 102 to be compressed against one another in the axial direction. Instead, the arrangement is designed with a certain amount of clearance, so that sleeves 100, 101 can rotate freely on the corresponding circumferential sections of upper part 88 in the region of upper section 81 and middle section 82.

Sleeves 100, 101 form, with their surfaces 105, 106, the guiding surfaces corresponding to surfaces 26, 27 in the exemplifying embodiment according to FIGS. 1 and 2.

At the top left of FIG. 3, it is also indicated in magnified fashion that an outer film 103 and an inner film 104 are provided on both sides of second sleeve 101 (and also, of course, correspondingly on first sleeve 100). The outer surface of outer film 103 is labeled 107, and the inner surface of inner film 104 is labeled 108.

The procedure for manufacturing kingpin 80 according to FIG. 3 (and analogously also according to FIGS. 2 and 4) is as follows:

For manufacture of a new kingpin 80, upper part 88 and lower part 85 are produced separately. To assemble kingpin 80, firstly second sleeve 101, then ring 102, and lastly first sleeve 100 are slid from below onto upper part 88. Lower part 85 is then set in place and thread-joined by means of threaded stud 91.

For reworking of an already existing kingpin of conventional design, the latter is turned off at its circumference to a diameter which corresponds to the standardized diameter minus twice the wall thickness of sleeves 100, 101. Reworking of a partially worn kingpin is only possible, of course, if the wear already existing is less than the wall thickness of the sleeve that is later to be put in place. Since the total allowable wear as defined by DIN is 2 mm, a kingpin can, for example, no longer be reworked if the wear already totals, for example, 1.8 mm but the wall thickness of the sleeve that is provided is only 1 mm.

The kingpin is then shortened at the free end and equipped with a, for example, frustoconical turned recess corresponding to mating surface 97. Lastly, kingpin 80 is also equipped with the central threaded bore 90.

Elements 102, 101, 100 are then slid onto the kingpin machined in this fashion, and axially secured, as already described, by screwing on a separately provided lower part 85.

Figure 4:
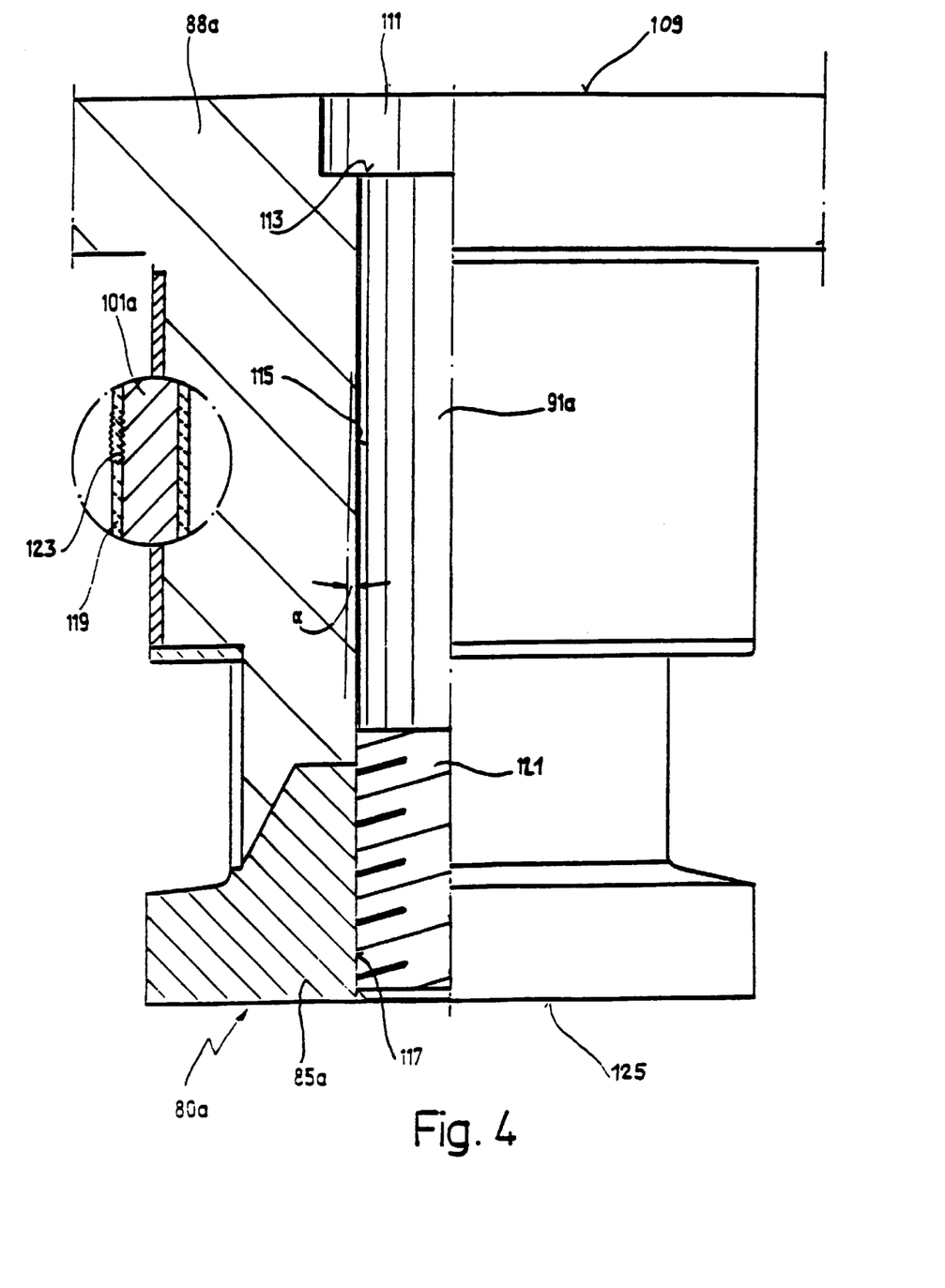
FIG. 4 shows a further view similar to FIG. 3, but for a further modified exemplifying embodiment.

FIG. 4 shows a further variant with a few deviations from the exemplifying embodiment shown in FIG. 3.

In kingpin 80a in FIG. 4, threaded stud 91a is inserted from an upper side 109 of kingpin 80a.

For this purpose, a head 111 of a slightly conical threaded stud 91a is inserted into a corresponding countersunk recess 113 in upper side 109. Upper part 88a of kingpin 80a is equipped with a correspondingly slightly conical passthrough bore 115, as indicated by an angle α of, for example, 1 degree. A threaded section 121 at the free end of threaded stud 91a, on the other hand, engages into a threaded bore 117 in lower part 85a of kingpin 80a.

For this purpose, threaded stud 91a is pressed axially after insertion into conical passthrough bore 115, and lower part 85a is then screwed on, The material of lower part 85a is thus weakened only to a minimal extent, and a flat underside 125 of lower part 85a is obtained.

The arrangement of the sleeves and the ring is unchanged as compared with that of FIG. 3, so that the description regarding FIG. 3 may be referred to in that context.

One special aspect can also be attained by way of features depicted at further enlarged scale at the top left of FIG. 4;

It is evident that outer surface 119 of sleeve 101a is equipped with a roughening 123, while the inner surface is smooth.

In this context, the surface roughness of roughening 123 is to be dimensioned such that the roughening is also effective on the outer surface of the thermal coating. For this purpose, the surface roughness is, for example, greater than the thickness of the thermal coating.

The purpose of this feature is to equip the sleeve with a higher coefficient of friction on its exterior than on its interior. The result is that the sleeve preferably rotates on the inner surface relative to the body of the kingpin, while on its outer surface it rests against the wear ring or coupling hook without rotating.

In the exemplifying embodiments according to FIGS. 3 and 4, lower part 85, 85a, in particular its conical arbor in the region of mating surface 86/87, is made of a very high-quality material. Lower part 85, 85a is preferably, during assembly of kingpin 80a, compressed by means of a press as far as the upper stop, and pressed on so that the surrounding material of upper part 88, 88a is tensioned in the region of mating surface 86/87.

In the exemplifying embodiment according to FIG. 4, threaded stud 91a has at its lower end pressure-rolled threads in the region of threaded section 116.

Sleeve 30 and 100, 101 itself is preferably manufactured from a hard metal.

Figure 5:
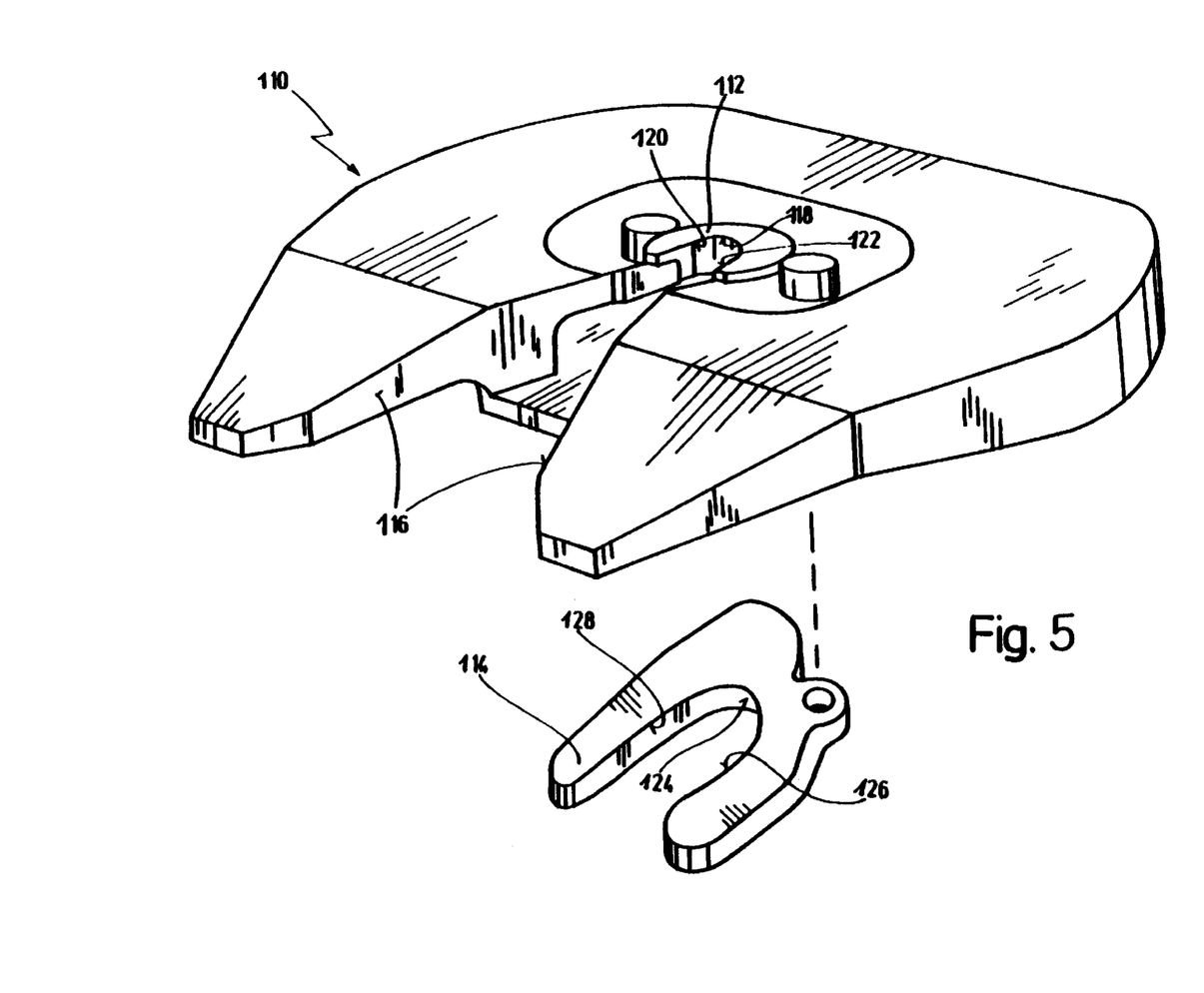
FIG. 5 shows a coupling plate of a tractor coupling with a disassembled locking hook belonging thereto, in a perspective exploded representation.

FIG. 5 shows a coupling plate, labeled with the general reference character 110, which is part of a tractor coupling for connecting a tractor truck (not shown here) to a semi-trailer (not shown). Coupling plate 110 is attached at the top of the rear end of the tractor.

Coupling plate 110 has a horseshoe-shaped wear ring 112 that can be removed from coupling plate 110, as well as a locking hook 114 that is shown in FIG. 5, for the sake of clarity, separately from coupling plate 110. Locking hook 114 is normally attached pivotally on coupling plate 110.

Coupling plate 110 opens toward the rear with a throat 116 at whose base wear ring 112 is arranged. The wear ring has a surface 118 in the form of a portion of a cylinder, serving as contact surface for a kingpin (not shown here) which in turn is a constituent of the semi-trailer. Surface 118 serving as the contact surface extends approximately as far as surface end sections 120 and 122, so that surface 118 of wear ring 112 encloses the kingpin in semicircular fashion. Locking hook 114 correspondingly has a surface 124, configured as contact surface for the remaining circumference of the kingpin, which extends as far as corresponding surface end sections 128 and 126.

In order to connect the trailer to the truck, the kingpin is moved into throat 116 of coupling plate 110 until it is resting against surface 118 of wear ring 112. Locking hook 114, attached pivotably at a corresponding point on coupling plate 110, is then pivoted so that together with wear ring 112, it surrounds the kingpin. Surface 124 of locking hook 114 and surface 118 of wear ring 112 together form, in complementary fashion to one another, an annular bearing assembly for the kingpin, which is positively and rotatably received in said bearing assembly.

FIGS. 6 through 9 depict wear ring 112 and locking hook 114 in more detail.

Figure 6:
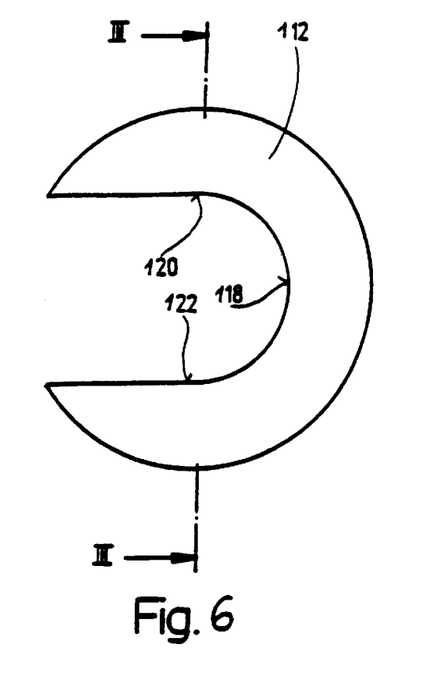
FIG. 6 shows a plan view of a wear ring of the coupling plate.
Figure 7:
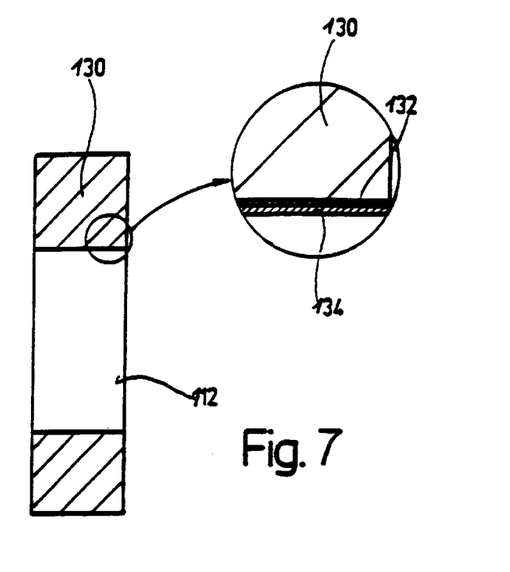
FIG. 7 shows a section along line III—III of FIG. 6.

Wear ring 112 consists of a base material 130, usually a tool steel. An adhesion film 132 made of a metal, for example titanium, is sputtered onto base material 130 at a thickness of approximately 1 $\mu$m. A carbon-based film 134 with a thickness of approximately 10 $\mu$m is deposited onto adhesion primer film 132 using a film deposition method, for example a PECVD (plasma-enhanced chemical vapor deposition) method. "Carbon-based films" are understood to mean pure carbon films with a diamond-like structure, metal-containing carbon films, or amorphous carbon films which are either pure or metal-containing.

Adhesion primer film 132 and carbon-based film 134 are provided on the entire surface 118 between surface end sections 120 and 122.

Adhesion primer film 132 can also be omitted when metal-containing carbon films are used.

Figure 8:
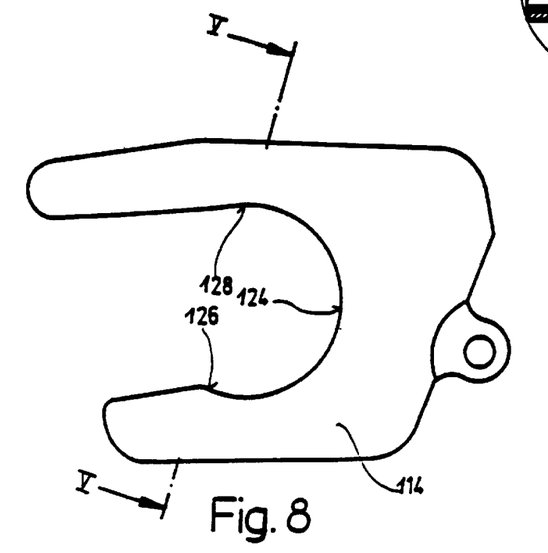
FIG. 8 shows a plan view of the locking hook.
Figure 9:
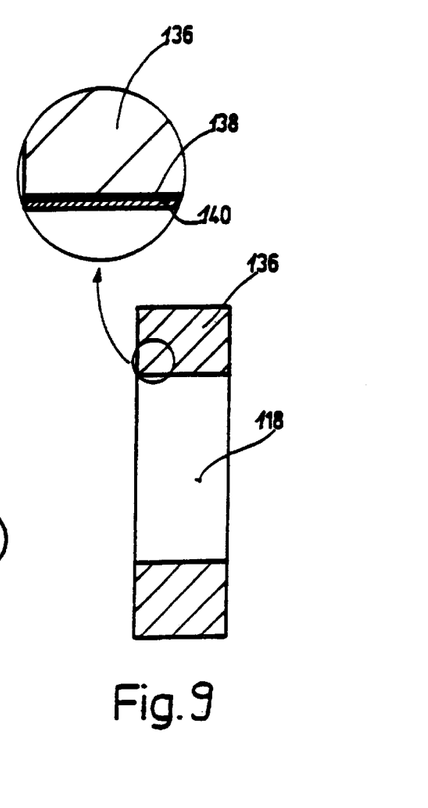
FIG. 9 shows a section along line V—V of FIG. 8.

An adhesion film 138 and a carbon-based film 140, also at a thickness of approximately 10 $\mu$m, are correspondingly deposited onto a base material 136 of locking hook 114.

What is claimed is:

1. A coupling device for connecting a towing vehicle to a semi-trailer, comprising:
    a tractor coupling plate for attachment to a towing vehicle, said coupling plate having locking elements for positively engaging and rotatably grasping a kingpin;
    a kingpin having a proximal end for attachment to a semi-trailer and a distal end, said kingpin having a substantially rotationally symmetrical external surface formed between said proximal end and said distal end; and
    a sleeve disposed about said kingpin and rotatable relative thereto, said sleeve having an abrasion-resistant thermal coating forming at least the outer surface thereof, the inner surface of said sleeve being adapted to matingly engage the external surface of said kingpin, and the outer surface of said sleeve being adapted for engagement by said tractor coupling.

2. The coupling device as defined in claim 1, wherein the outer surface of said sleeve is roughened.

3. The coupling device as defined in claim 2, wherein the roughened surface of said sleeve has a surface roughness which is greater than the thickness of the thermal coating.

4. The coupling device as defined in claim 1, wherein the inner surface of said sleeve is also formed by an abrasion-resistant thermal coating.

5. The coupling device as defined in claim 1, wherein the sleeve is burnished on its surfaces provided for the thermal coating.

6. The coupling device as defined in claim 1, wherein the thermal coating is a carbon-based film.

7. The coupling device as defined in claim 6, wherein the thermal coating is a film made of substantially amorphous carbon.

8. The coupling device as defined in claim 1, wherein the sleeve is of multi-shelled configuration in the circumferential direction.

9. The coupling device as defined in claim 8, wherein the sleeve is of two-shelled configuration.

10. The coupling device as defined in claim 8, wherein the sleeve has axial ends and is equipped, at least at one of its axial ends, with a circumferential bevel that tapers the sleeve toward its ends; the sleeve being axially secured to the kingpin by means of at least one counterbeveled attachment element.

11. The coupling device as defined in claim 10, wherein the attachment element is configured, at the distal end of the kingpin as a cover that is equipped at its circumference with a counterbevel.

12. The coupling device as defined in claim 10, wherein the attachment element is configured at the proximal end of the kingpin as a ring that is equipped at its circumference with a counterbevel.

13. The coupling device as defined in claim 12, wherein the ring is arranged axially displaceably on the kingpin.

14. The coupling device as defined in claim 13, wherein the ring is axially supported by the kingpin, on its side facing away from the counterbevel, via an elastic element.

15. The coupling device as defined in claim 14, wherein the ring is supported via an O-ring on a radial surface of the kingpin.

16. The coupling device as defined in claim 1, wherein the sleeve is of multi-part configuration in the axial direction.

17. The coupling device as defined in claim 16, where in the kingpin comprises an axially multi-part body, a lower part arranged at the distal end of the kingpin being removable, and the several sleeve parts being slidable, when the lower part has been removed, onto an upper part of the multi-part body.

18. The coupling device as defined in claim 17, wherein the lower part of the multi-part body is mounted positively in the radial direction in the upper part.

19. The coupling device as defined in claim 18, wherein the lower part is mounted in the upper part via a frustoconical seat.

20. The coupling device as defined in claim 17, wherein the lower part of the multi-part body is thread-joined to the upper part.

21. The coupling device as defined in claim 20, wherein the lower part is thread-joined to the upper part via an axial threaded stud.

22. The coupling device as defined in claim 21, wherein the threaded stud is inserted through the upper part from a side of the kingpin facing away from the lower part, and is thread-joined at a threaded end of the lower part.

23. The coupling device as defined in claim 22, wherein the threaded stud is of conical configuration, and is inserted into a conical passthrough bore of the upper part and compressed there.

24. The coupling device as defined in claim 17, wherein the sleeve parts are retained axially by thread-joining of the several parts of the multi-part body.

25. The coupling device as defined in claim 16, wherein the sleeve parts have a different diameter and rest, on axially opposite sides, against a disk which is slid onto a part of the kingpin and extends substantially radically thereof.

26. The coupling device as defined in claim 1, wherein the sleeve consists of hardened metal.

27. In a coupling device including a kingpin device for attachment to a semi-trailer, and a tractor coupling plate assembly for attachment to a towing vehicle and operative to lockingly engage the kingpin device, an improved kingpin device comprising:
  an axially elongated, generally cylindrical stud of a first diameter having a proximal end for attachment to the semi-trailer said stud having a distal end, and an axially extending midlength segment of a second diameter which is less than said first diameter; and
  a sleeve disposed about said stud and rotatable relative thereto, said sleeve generally conforming to the outer surface of said stud and having an abrasion-resistant thermal coating forming at least the outer surface thereof, the inner surface of said sleeve being adapted to matingly engage the external surface of said stud, the outer surface of said sleeve conforming to said midlength segment being adapted for engagement by a tractor coupling plate assembly.

28. A coupling device having a coupling plate for attachment to a towing vehicle, and having a wear ring and a locking hook made of a base material for engaging and coacting with a kingpin, the surfaces of the war ring and of the locking hook which come into contact with the kingpin having an anti-friction film formed thereon, wherein the anti-friction film is a carbon-based film.

29. The coupling device as defined in claim 28, where the carbon-based film has an amorphous structure.

30. The coupling device as defined in claim 28, wherein the carbon-based film is a pure carbon film.

31. The coupling device as defined in claim 28, wherein an adhesion primer film is arranged between the carbon-based film and base materials of the wear ring and locking hook.

32. The coupling device as defined in claim 28, wherein the carbon-based film is metal-containing.

33. The coupling device as defined in claim 28, wherein the carbon-based film is applied using a film deposition method.

34. The coupling device as defined in claim 28, wherein the carbon-based film has a thickness of approximately 1 to 20 $\mu$m.

35. A method for modifying coupling devices for connecting a towing vehicle to a semi-trailer in a state in which lubricant-free and thus maintenance-free operation of the coupling device is possible, and wherein a kingpin is for attachment to a towed vehicle, and a tractor coupling plate for attachment to the towing vehicle, said tractor coupling plate having locking elements for positive and rotatable grasping of substantially rotationally symmetrical surfaces of the kingpin, comprising the steps of:
  a) lathe-turning the surfaces of the kingpin off by a predefined over-measure;
  b) manufacturing a sleeve for placement on the turned-off kingpin, the wall thickness of the sleeve being substantially identical to the over-measure;
  c) thermally coating at least the outer surface of the sleeve with an abrasion-resistant coating; and
  d) placing the sleeve onto the turned-off kingpin in such a way that the sleeve is rotatable on the kingpin.

36. The method as defined in claim 35, wherein in step c), the sleeve is also equipped on its inner surface with an abrasion-resistant coating.

37. The method as defined in claim 35, wherein before step c) the sleeve is burnished.

38. The method as defined in claim 35, wherein before step c) the sleeve is roughened on its outer surface.

39. The method as defined in claim 35, wherein the thermal coating operation comprises application of a film of amorphous carbon.

40. The method as defined in claim 35, wherein the kingpin is comprised of two parts such that a lower part arranged at a distal end of the kingpin is removable, and the sleeve, when the lower part has been removed, is slid onto an upper part of the kingpin.

41. The method as defined in claim 40, wherein after the sleeve has been slid on, the lower part is axially thread-joined to the upper part, and the sleeve is thereby axially retained.

\* \* \* \* \*